June 25, 1968 G. A. LEMCKE ET AL 3,389,643
BAG MAKING APPARATUS AND METHOD
Filed July 22, 1966 9 Sheets-Sheet 1

INVENTORS
GEORGE A. LEMCKE
PETER A. TUCHER
BY: Mason, Kolehmainen, Rathburn & Wyss
ATT'YS June 25, 1968

G. A. LEMCKE ET AL

3,389,643

BAG MAKING APPARATUS AND METHOD

Filed July 22, 1966

INVENTORS:
GEORGE A. LEMCKE
PETER A. TUCHER

BY: Mason, Kolehmainen, Rathbury & Wyss
ATT'YS

June 25, 1968 G. A. LEMCKE ET AL 3,389,643
BAG MAKING APPARATUS AND METHOD
Filed July 22, 1966 9 Sheets-Sheet 8

*INVENTORS:*
GEORGE A. LEMCKE
PETER A. TUCHER

BY: *Mason, Kolehmainen, Rathburn & Wyss*
ATT'YS

June 25, 1968    G. A. LEMCKE ET AL    3,389,643

BAG MAKING APPARATUS AND METHOD

Filed July 22, 1966    9 Sheets-Sheet 9

FIG. 24

INVENTORS:
GEORGE A. LEMCKE
PETER A. TUCHER

BY *Mason, Kolehmainen, Rathburn & Wyss*
ATT'YS

United States Patent Office 3,389,643
Patented June 25, 1968

3,389,643
BAG MAKING APPARATUS AND METHOD
George A. Lemcke and Peter A. Tucher, Indianapolis, Ind., assignors to Parish Manufacturing & Distributing Corporation, Indianapolis, Ind., a corporation of Indiana
Filed July 22, 1966, Ser. No. 567,166
17 Claims. (Cl. 93—8)

The present invention relates to a bag making apparatus and method, and, more particularly, to an apparatus and method for making and assembling containers such as plastic liners for milk and other food cartons of the type having a tube secured thereto for filling and emptying the container.

More specifically liners of polyethylene and like material are commercially used within corrugated paper boxes or other outer containers for the storing, shipping, and dispensing of milk by restaurants and other commercial users. Such containers may be in the one to five gallon or larger size and are provided with a tube extending from the lining for initially filling the container and for subsequently dispensing the contents of the same. The commercial use of such containers has become increasingly popular for the dispensing of milk since many state sanitation laws prohibit the dispensing of milk or cream in restaurants except either in individual containers or from a dispensing device—that is, the dispensing of milk by hand from milk bottles of the common one quart and similar size is prohibited.

Although such bags or liners are not expensive, they are expendable and they are used in large quantities. Therefore the commercial situation dictates that they be inexpensive. Heretofore such bags have generally been made with hand labor; their assembly and manufacture has been difficult to automate.

A typical liner presently commercially available could be formed of two superimposed sheets of polyethylene or other suitable plastic material, heat sealed around their edges. A filling and dispensing tube is provided and to this end a grommet including a washer and a stem is assembled through the container, the washer being on the inside of the container and the stem extending through an opening in one of the plastic sheets. The grommet is then sealed to the respective sheet in any suitable manner, preferably by a combination of heat and pressure. Once the grommet has been assembled to the sheet, a tube section is forced over the stem. In a preferred commercial embodiment, the tube section may consist of a short length of flexible tubing, having a stopper or plug in one end. The tubing is assembled over the stem to provide a hermetic seal between the stem and the tubing. It will be appreciated that since the liner in this application is designed for carrying milk and like consumable liquids, the entire operation must be carried out in very sanitary conditions. For this reason the tube section must be assembled on the grommet stem in a dry condition.

After the liner has been completed, it will be assembled at the dairy within a paperboard or similar box, the filling and dispensing tube extending through the box. The plugged end of the tube will be cut off to permit pressure filling of the container. Subsequently another plug will be driven in to the end of the tube to reseal the container. In use the container may be placed within a milk dispensing unit at the restaurant, under refrigeration, with the tube thereof extending through a pinch type valve. The end of the tube containing the plug will again be cut off to provide for dispensing the contents therefrom. The pinch type valve is designed to squeeze pinch the tube to shut off the tube.

In a typical commercial embodiment, the liner may be formed of two sheets of polyethylene, each approximately 18 x 24 inches. The filler and dispensing tube may be positioned toward a corner of the sheets and may initially comprise a tube of approximately 9 inches long and having approximately a 5/16 inch inside diameter.

In the hand making of the liners according to the prior commercial method, it was necessary first to hand cut two sheets of superimposed plastic, to mark the point on one of the sheets where the tube should project, to pierce the sheet at the desired point, to hand assemble a grommet through the pierced sheet, to heat seal the grommet to the sheet, and then to hand force the tube section over the stem of the grommet. Considerable difficulty has been experienced in this assembly. This is due largely because the tube section must be assembled dry over the stem; additionally because the stem section must be gripped tight enough to force the assembling operation, but loose enough to permit the tube section wall to expand as it is forced over the stem. Subsequently the remaining side or sides of the sheets are sealed to complete the liner. Moreover, although two separate sheets may be used for the walls of the container, heat sealed along all four edges, it is understood that the liner may also be made of a continuous tube of plastic film of the proper width so that only the two edges of the containers must be heat sealed.

Accordingly one object of the present invention is to provide a new and improved bag making apparatus which overcomes the above mentioned difficulties.

Another object of the present invention is to provide a new and improved automatic bag making apparatus.

Yet a further object of the present invention is to provide a new and improved bag making apparatus which will provide for the manufacture of disposable liners at a comparatively low cost.

Yet a further object of the present invention is the provision of a new and improved method for making bags which overcomes the above mentioned difficulties.

Yet another object of the present invention is a bag making method.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a new and improved machine for making bags, particularly of the type suitable for liners of commercial milk cartons and the like. In accordance with one feature of the invention the apparatus will automatically secure a tube assembly to a thin sheet of polyethylene or like material. The tube assembly as presently used commercially includes a tube grommet having a stem extending through an opening in the sheet and sealed thereto, and a tube section assembled over the stem.

The machine according to the present invention includes a machine bed for receiving a sheet of material extending across a work axis at a work station. Means are provided for assembling a grommet through a hole in the sheet of material and aligned along the work axis. A movable turret is provided having a plurality of work heads selectively alignable along the work axis. A first one of the work heads includes a heating and pressure pad for forming a seal between the grommet and the sheet. A second one of the work heads includes means for assembling a tube section over the stem of the grommet. The turret is selectively moved alternately aligning the first and second workheads with the grommet along the work axis of the machine. In a preferred embodiment of the invention means are provided for directing pressurized fluid into the tube as it is assembled over the stem of the grommet to readily expand the tube and thereby facilitate assembly of the tube over the stem. In accordance with another feature of the present invention, a grommet spindle is provided for receiving the grommet. The grommet spindle includes a sharpened point for piercing the sheet as the grommet is driven toward the sheet. In accordance with another embodiment of the invention the tube is gripped with a predetermined radial force as it is assembled over the stem of the grommet thereby to permit radial expansion of the tube as it is expanded under the force of the pressurized air and as it expands while being forced over the stem of the grommet.

The present invention is also directed to an improved method of making the liners, and more particularly, to an improved method of securing the tube to the liner. More specifically, the method includes supporting the grommet on a spindle to prevent collapse of the grommet stem; gripping a tube with a predetermined radial force; and assembling the tube over the stem of the grommet radially expanding the tube while maintaining the constant radial force. In accordance with another feature of the present invention, pressurized fluid may be directed into the tube to radially expand the tube as it is assembled over the stem of the grommet.

For a better understanding of the present invention reference may be had to the accompanying drawings wherein.

Figure 1:
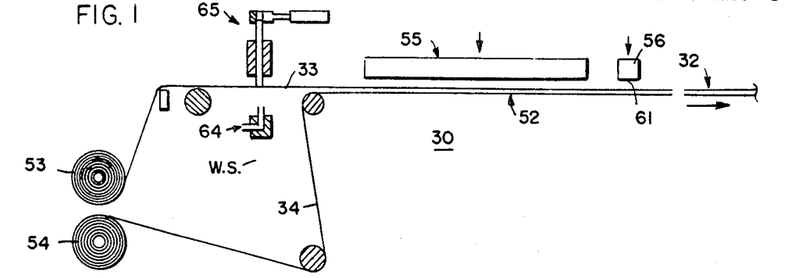
FIG. 1 is a schematic layout of the machine and method of forming liners according to the present invention.
Figures 2, 3, 4, 5A, 5B, 5C, 5D, 5E, 5F, 5G, 5H, 5I:
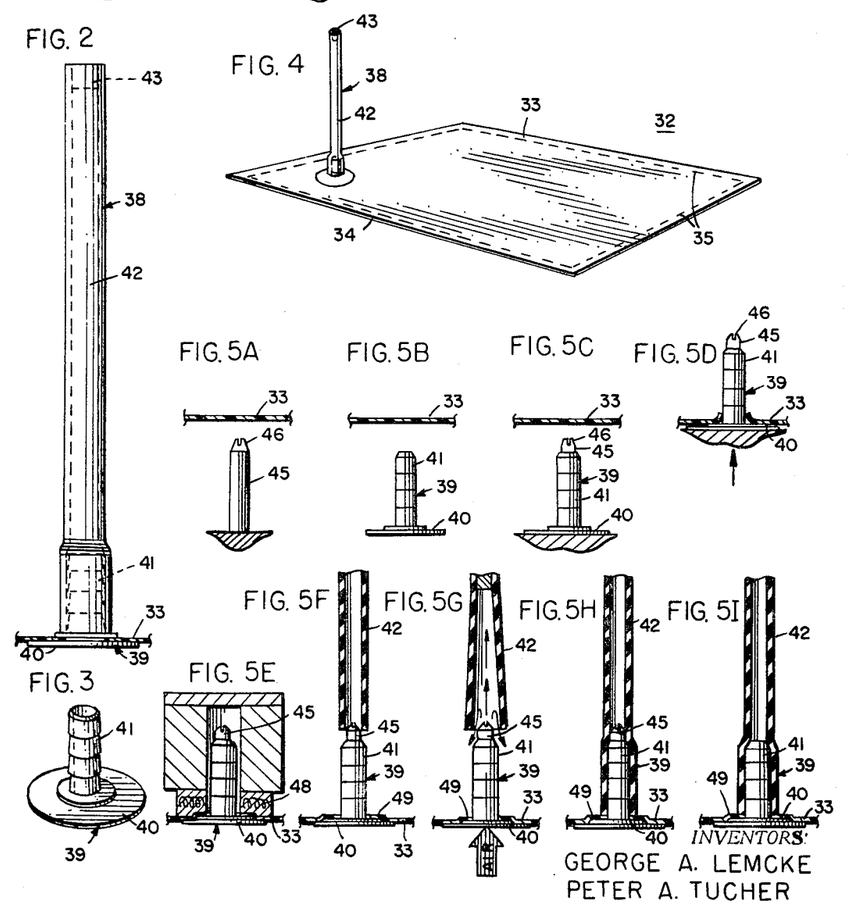
FIG. 2 is an enlarged fragmentary view of the grommet and tube section assembled through a sheet forming a side of the liner.
FIG. 3 is a perspective view of a grommet used in the reinforcement of the liner according to the present invention.
FIG. 4 is a perspective view of a finished liner according to the present invention.
FIGS. 5A through 5I are fragmentary sectional views illustrating a step by step sequence of the assembly of the stem assembly to the liner.
Figures 6, 7, 8:
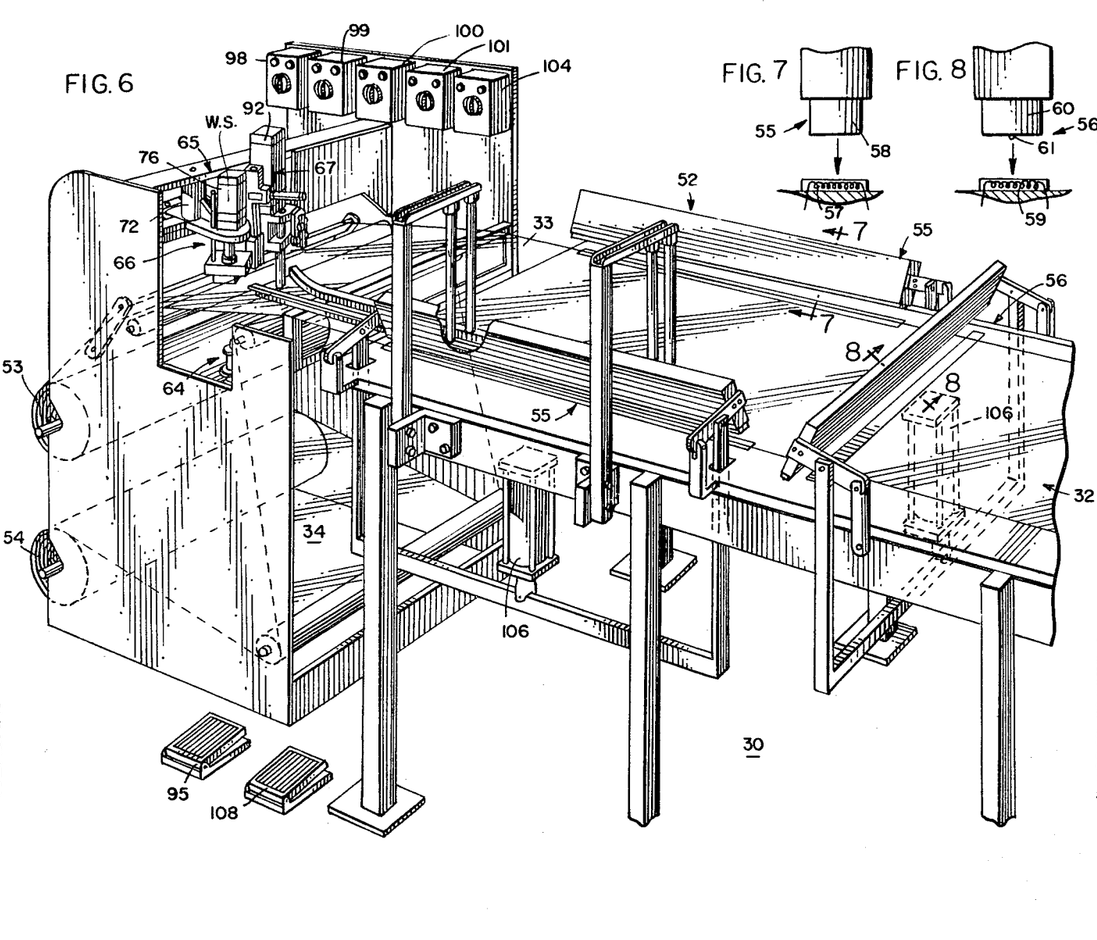
FIG. 6 is a perspective view of the machine layout according to the present invention.
FIG. 7 is a fragmentary cross sectional view of a sealing element, taken along line 7—7 of FIG. 6.
FIG. 8 is a fragmentary sectional view of a typical sealing and cutoff element taken along line 8—8 of FIG. 6.

Referring now to the drawings there is illustrated a bag making machine 30 illustrated in FIG. 6, and schematically represented in FIG. 1. The bag making machine 30 is adapted to make bags or liners 32, FIG. 4, from suitable sheets or tubes of thin film material such as polyethylene. As illustrated in FIG. 4, the liner 32 is formed of upper and lower sheets 33, 34 of polyethylene, heat sealed along their edges as indicated at 35 to provide a closed container, and provided with a combination filler and dispensing tube assembly 38. As best illustrated in FIGS. 2 and 3, the tube assembly 38 includes a grommet 39 including a base washer 40 and a hollow stem 41. The tube assembly 38 additionally includes a tube section 42 fitted over the stem 41 and having its other end normally closed by a suitable stopper 43 forming a seal. It will be understood, in the manner heretofore described, that the liner 32 is intended for insertion within a corrugated or other milk or liquid containing carton and that the carton may then be pressure filled by first cutting off the end of the tube containing the stopper 43, pressure filling the carton and thereafter resealing the carton by plugging the tube assembly 38 with an additional stopper.

Figures 9, 10, 11, 12:
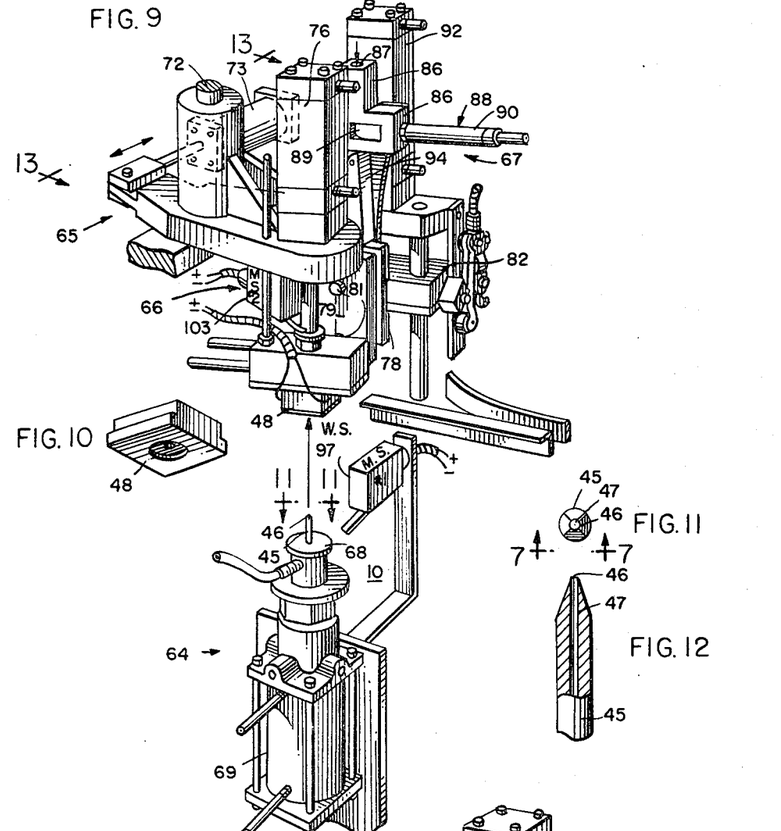
FIG. 9 is a fragmentary perspective view of the machine of FIG. 6, taken along the work station thereof, and illustrating the machine in the at rest position.
FIG. 10 is a perspective view of the heat sealing and pressure pad carried by one of the workheads of the machine of FIG. 9.
FIG. 11 is a plan view of the grommet spindle of the machine of FIG. 6.
FIG. 12 is an elevational fragmentary sectional view of the grommet spindle of FIG. 11.

The steps in the process of securing the tube assembly to the sheet of plastic material are represented by the illustrations 5A through 5I. Referring to FIGS. 5A through 5I, FIG. 5A illustrates a grommet spindle 45 positioned below the sheet 33 at the start of the bag forming operation. As also illustrated in FIGS. 11 and 12, it will be seen that the grommet spindle 45 has a sharpened knife-like point 46 and an hollow interior defining an air passageway 47. FIG. 5B illustrates the grommet 39 in position with reference to the sheet 33. FIG. 5C illustrates the grommet 39 assembled on the grommet spindle 45, still prior to the piercing and assembly of the sheet 33. Subsequent to the positioning of the grommet 39 on the grommet spindle 45, the grommet spindle 45 is driven through the sheet 33, the knife-like point 46 piercing the sheet and simultaneously driving the stem 41 of the grommet through the pierced opening. Once the grommet 39 is assembled with the sheet 33, the grommet 39 is hermetically sealed to the sheet 33. As illustrated in FIG. 5E, a suitable heating and pressure element 48, also illustrated in FIG. 10, provides a heat seal 49 between the washer 40 and the sheet 33. The tube 42 is then assembled on the grommet 39. Compressed air is directed through the hollow grommet spindle 45 by means of the air passageway 47 to aid in expanding the tube 42 and permit the tube section 42 to be forced over the grommet 39 to the position illustrated in FIG. 5H. As heretofore described, the tube section 42 has its other end closed with the stopper 43 thereby rendering the compressed air effective to radially expand the tube section 42. The compressed air will, of course, be sanitized in view of the sterile conditions required in food handling liners. For the same reason it is necessary that the tube section 42 be forced onto the grommet 39 without the benefit of lubricants. Subsequent to the assembly of the tube section 42 onto the grommet 39, the grommet spindle 45 may be removed, as illustrated in FIG. 5I.

The bag making machine 30, best illustrated in FIGS. 1 and 6, will carry out the assembly operation of the tube assembly 38, as heretofore described, in addition to completing the manufacture of the liner 32. Referring now to FIGS. 1 and 6, the bag making machine 30 includes a machine bed 52 across which the first sheet 33 of plastic material may be drawn from a suitable roll 53, and across at least a portion of which the second sheet 34 of plastic material may be drawn from a second roll 54. It will be seen from the schematic representation of FIG. 1 that the lower sheet 34 of plastic material passes below the work station of the bag making machine, subsequently to be united with the upper sheet 33 after the insertion of the tube assembly 38. To this end there is provided a pair of side sealing elements 55, of the heat sealing type, also illustrated in FIG. 7; and an end sealing and cutoff element 56, best illustrated in FIG. 8. The side sealing elements 55 each includes a suitable heating element 57 carried on the machine bed 52 below the sheets 33 and 34, and a pressure pad 58 to provide a combination of heat and pressure during the sealing operation. Moreover the end sealing and cutoff element 56 includes a heating element 59 carried by the machine bed 52 below the sheets 33 and 34, and a pressure pad 60 above the sheets 33 and 34 to provide for the heat sealing of two adjacent bags from the respective rolls of plastic material. Additionally the end sealing and cutoff element 56 includes a Nichrome wire 61 carried by the pressure pad 60 and intermediate the transverse width of the heating element 59 to provide a cutting operation between adjacent bags. It will be understood that the end sealing and cutoff element 56 simultaneously seals the adjacent edges of two adjacent bags from the rolls 53 and 54, and simultaneously cuts or separates the two bags.

The tube inserting operation on the sheet 33 takes place along the machine bed 52 ahead of the sealing operation just described and, in the illustrated embodiment, takes place along a work station, identified as W.S. To this end the machine 30 is provided with a grommet head 64, including the grommet spindle 45, and a turret 65 having a grommet assembling head 66 and a tube assembling head 67.

Referring first to the grommet head 64, and particularly to FIG. 9, the grommet head 64 includes the hollow grommet spindle 45 provided with the knife edge 46 for receiving a grommet. The grommet head 64 is mounted on the machine 30 below the single layer or sheet 33. The spindle 45 provides inner support for the stem 41 of a grommet and the grommet head includes a washer-like surface 68 for engaging the lower surface of the washer 40 of the grommet 39. The grommet head 64 includes an air cylinder 69 for moving the grommet spindle 45 vertically along the work axis of the machine to move a grommet into work position in the machine.

Figure 13:
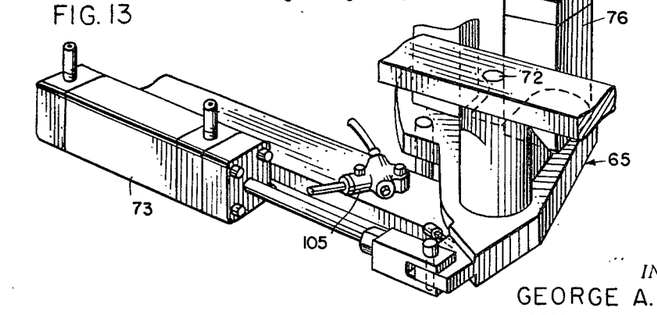
FIG. 13 is a fragmentary top perspective view of the machine of FIG. 6, illustrating the turret moving mechanism.
Figure 15:
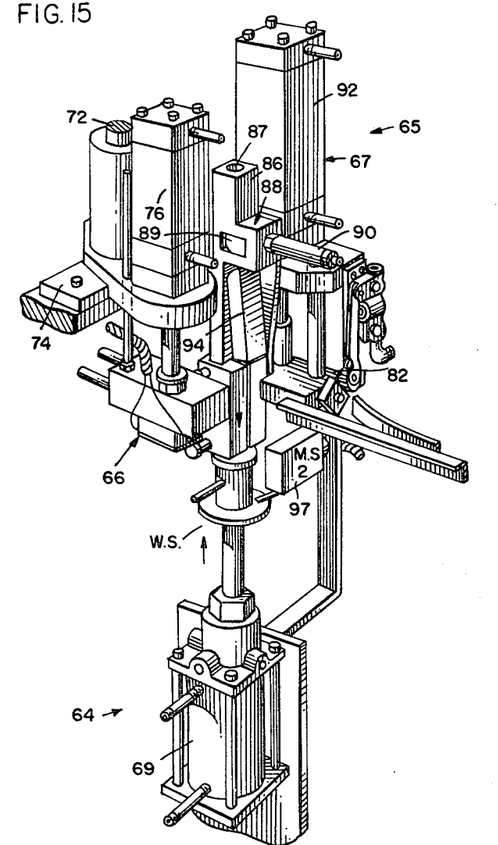
FIG. 15 is a fragmentary perspective view of the work station of the machine of FIG. 6 illustrated during the tube assembling operation.
Figure 21:
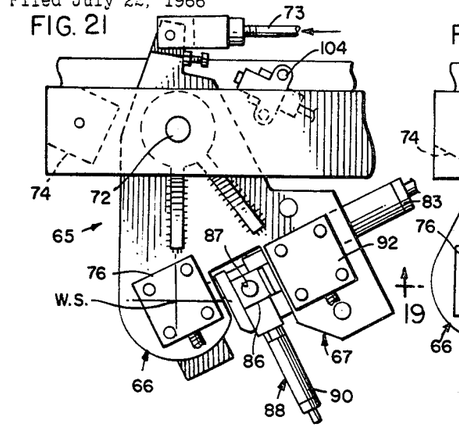
FIG. 21 is a fragmentary plan view of the machine of FIG. 6, illustrating the grommet sealing head along the work axis of the machine.
Figure 22:
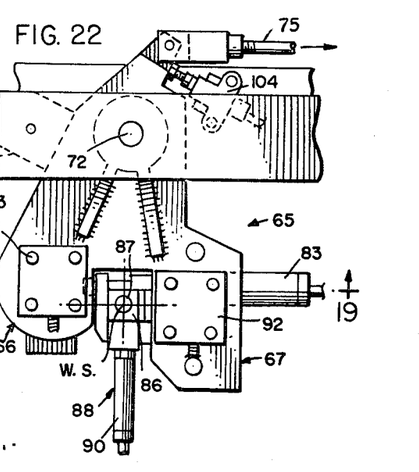
FIG. 22 is also a fragmentary plan view of the machine of FIG. 6 taken at the work station of the machine, but illustrating the tube assembling head along the work axis of the machine.

Referring now to the turret 65, in the illustrated embodiment the turret 65 is mounted about a pivot 72 for oscillatory movement wherein respective ones of the grommet assembling head 66 and the tube assembling head 67 are selectively brought into the work station, as best illustrated in FIGS. 21 and 22. An index cylinder 73, FIG. 13, is connected to oscillate the turret 65 between its two positions. A stop 74, FIG. 15, aligns the tube inserting head of the turret 65 at the work station.

Figure 14:
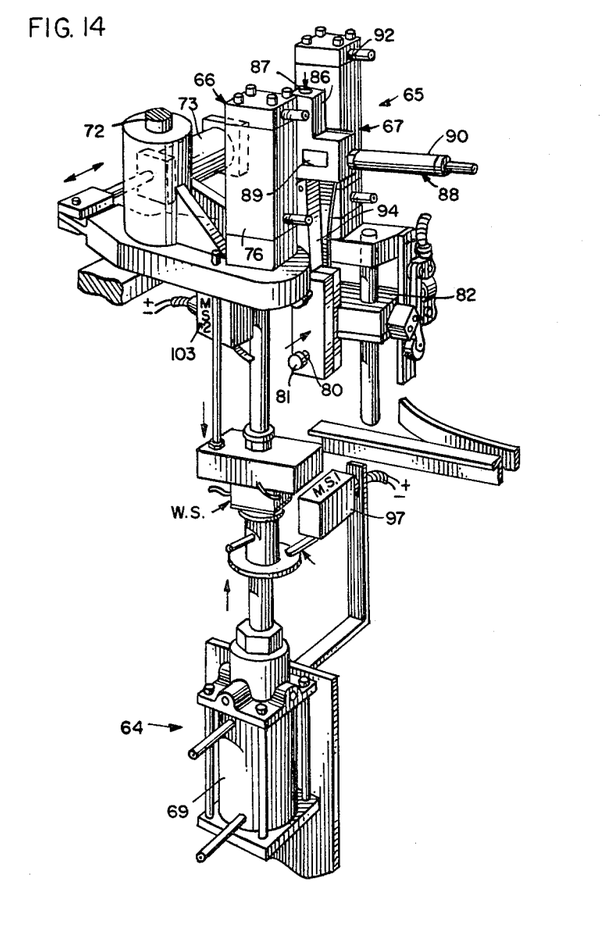
FIG. 14 is a fragmentary perspective view of the work station of the machine of FIG. 6, illustrated during the heat sealing and pressure operation.

With the turret 65 in its first, or grommet inserting position, as illustrated in FIGS. 9, 14, and 21, the grommet assembling head 66 is aligned along the work station of the machine 30. The grommet assembly head, as heretofore described, includes the heating and pressure element 48, as well as a grommet cylinder 76 for moving the heating and pressure element 48 vertically along the work axis to engage the sheet 33 and to provide the hermetic seal, as indicated in FIG. 14 and in FIG. 5E. Upon completion of the grommet sealing operation, the heating and pressure element 48 will retract, and the turret 65 will be actuated by the index cylinder 73 so as to align the tube assembling head 67 along the work axis of the machine 30.

Figures 16, 17, 18:
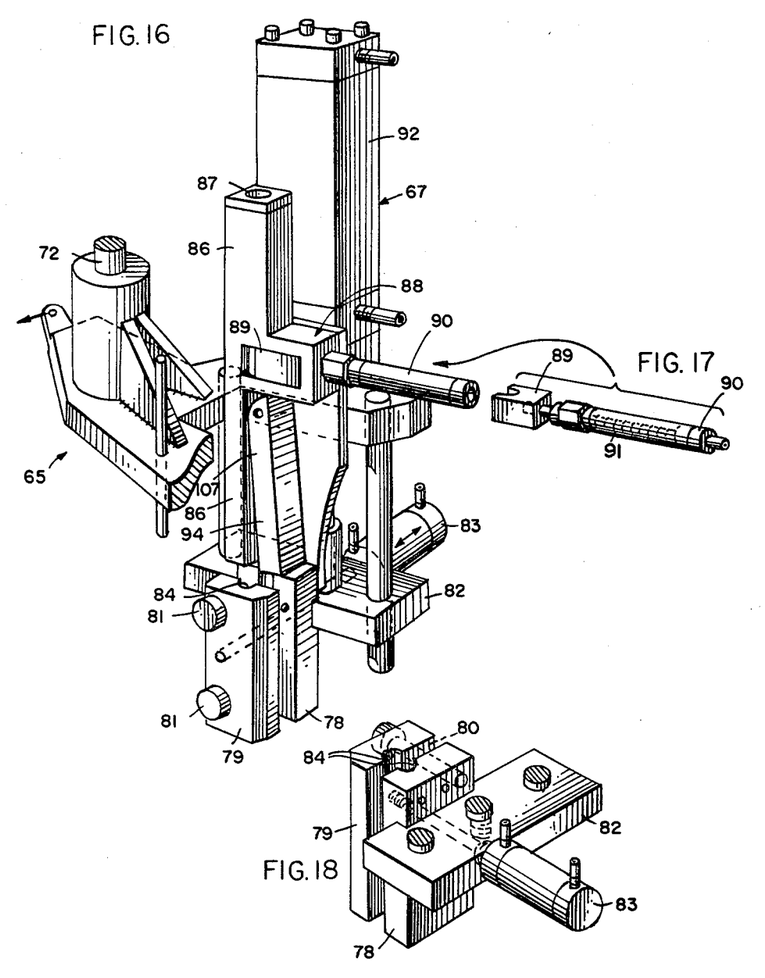
FIG. 16 is an enlarged perspective view of the tube assembling head of the machine of FIG. 6.
FIG. 17 is a detail view of the tube holding mechanism of FIG. 16.
FIG. 18 is a detail view of the jaw clamping mechanism of FIG. 16.
Figure 19:
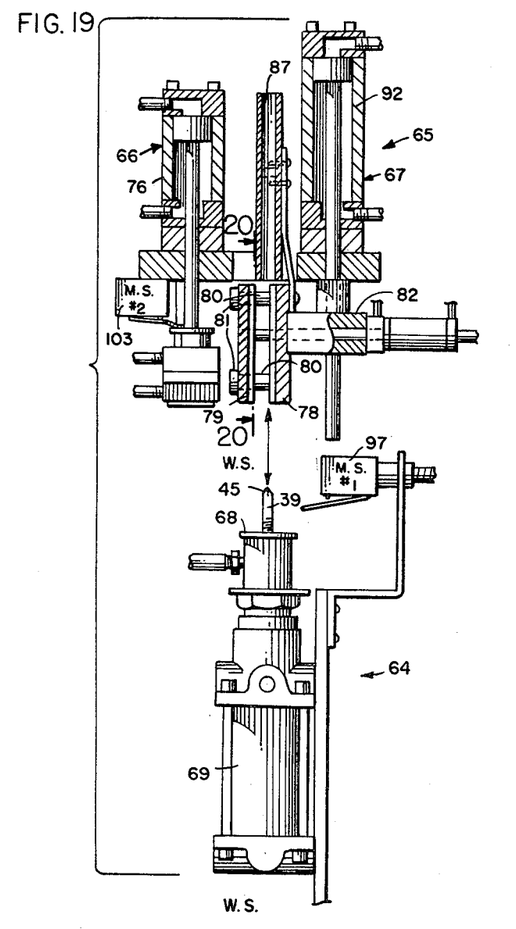
FIG. 19 is a fragmentary cross sectional view of the machine of FIG. 6, shown at the work station of the machine and illustrated with the tube assembling head aligned at the work axis.
Figure 20:
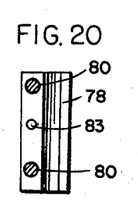
FIG. 20 is a detail cross sectional view of the clamping jaws of the tube holding mechanism taken along line 20—20 of FIG. 19.

Referring now to the tube assembling head 67 mounted on the turret 65, as best illustrated in FIGS. 15, 16, 19, 21, and 22, the tube assembling head includes a pair of tube jaws, one of which is a fixed jaw 78 and the other of which is referred to as a movable jaw 79, FIGS. 16 and 18. Suitable guide rods 80 having stop heads 81 guide the movement of the movable jaw 79 relative to the fixed jaw 78. The jaws 78 and 79 are mounted to a vertically movable support 82 and a jaw cylinder 83 is provided for closing the jaws 78 and 79 relative to each other. It will be understood that the jaws 78 and 79 have confronting semicylindrical recesses 84 generally conforming to the outer surface of a tube for effectively gripping the tube. The air cylinder 83 is designed with a suitable cross sectional area so that at the regulated or controlled pressure the jaws will exert a predetermined radial pressure on a tube which is held in the recesses 84 so that a substantially fixed radial force is applied to the tube.

To provide for loading the tube between the jaws 78 and 79, directly above the jaws 78 and 79 is a tube guide or rack 86 including a tube track 87 for receiving the tube section 42. A tube clamp assembly 88 is provided including a movable tube clamp 89, FIGS. 16, 17, adapted to pinch squeeze the tube section 42 to retain the tube and to prevent the stopper 43 from being blown out. The tube clamp is biased into clamping engagement with a tube by means of a clamp cylinder 90 having a spring return 91, FIG. 17. A tube cylinder 92 moves the support, and consequently the jaws 78 and 79 and the tube guide 86 vertically to provide for the final assembly of the tube section 42 onto the grommet 39. A free swinging flap door or gate 94 defining a portion of the tube track 87 is provided so that the assembled tube will clear the tube assembling head when the turret 65 returns to its original position. Preferably the gate 94 is spring loaded to facilitate original loading of the tube section 42 into the tube guide 86.

Figure 23:
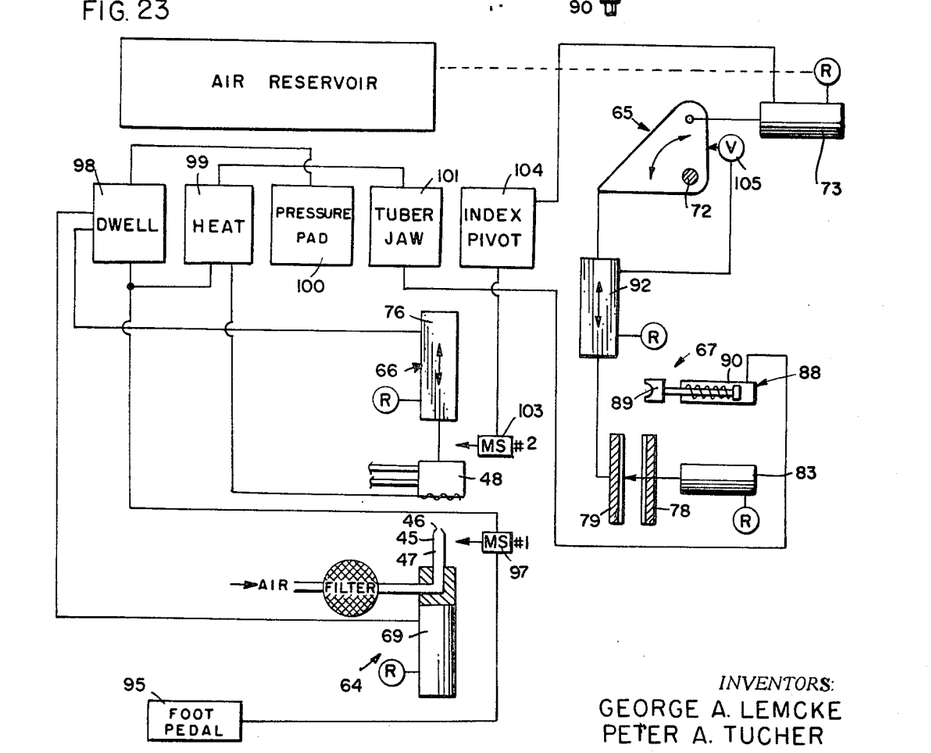
FIG. 23 is a diagrammatic illustration of the interrelation of the components of the machine of FIG. 6.

From the above detailed description of the bag making machine 30, its operation is believed clear. However, briefly, and with further reference to the diagrammatic representation of FIG. 23, it will be understood that the machine, at rest, is illustrated in FIG. 9 with the grommet head 64 and the grommet assembling head 66 at the work station of the machine and spaced apart; the grommet head 64 being below the sheet 33 while the grommet assembling head 66 is above the sheet 33. A grommet 39 is loaded onto the grommet spindle 45 and a tube section 42 is loaded into the tube track 87. With the grommet 39 and the tube section 42 both in place, depression of a tube pedal or foot pedal 95 causes the heating and pressure element 48 to move down against the upper surface of the sheet 33. Simultaneously the lower grommet spindle 45 raises to position, puncturing the sheet 33 and tripping microswitch 97 identified as M.S. #1. This microswitch 97 initiates the main or dwell timer 98 and additionally controls a heat timer 99 which measures the length of time for the grommet heat seal. At the beginning of the heat seal time, the jaws 78 and 79 close, and the clamp assembly 88 closes, holding the top of the tube, under the control of a jaw timer 101. The heating and pressure element 48 will dwell a sufficient time in its lower position under the control of a pressure pad timer 100 to provide the necessary heat seal. Upon the completion of the seal, the grommet assembling head 66 will rise out of position and will engage a microswitch 103, identified as M.S. #2, which, through an index relay 104, will control the indexing of the turret 65 to bring the tube assembling head 67 into the work station. At the completion of the indexing movement, the turret strikes an air valve 105 actuating the tube cylinder 92 to lower the head assembly. When the tube section 42 is even with the top of the grommet 39, sanitized air is admitted through the hollow spindle 45 to expand the lower end of the tube section 42. The spindle 39 is approximately one quarter inch longer than the grommet stem 41, so that most of the air is used to enlarge the rubber tube, thereby making it easier to insert the tube on the grommet and complete the operation. Moreover the clamp cylinder 49 holds the top of the tube section 42 so that the stopper 43 will not blow out. The main jaws 78 and 79 are held at only a predetermined radial pressure, for example 30 pounds, to allow expansion of the tube 42 due to the double thickness of the grommet 39 and the tube.

The jaws 78 and 79 will open upon directive from the main timer 98. At this time the spindle goes down, leaving the grommet 39 supported on the film. Moreover the tube assembling head 67 raises to its top position for the next cycle.

Once the tube assembly 38 is connected to the sheet 33, an operator may grab the free ends of both sheets 33 and 34 adjacent the discharge end of the machine bed 52, that is, adjacent the end sealing and cutoff element 56, and pull the two sheets superimposed upon each other to provide for the correct length of liner desired. At this time the side sealing elements 55 and the end sealing and cutoff element 56 are activated to the lower position by means of a cutoff pedal 108, FIG. 6, through suitable cylinder mechanism 109, to simultaneously seal the sides and end of the liner, and to cut the liner separate from the next succeeding liner. The sealing and cutoff cycle may be either under the manual control of the operator at the cutoff pedal 108, or may be automatically controlled by suitable timing means, as known in the art.

Figure 24:
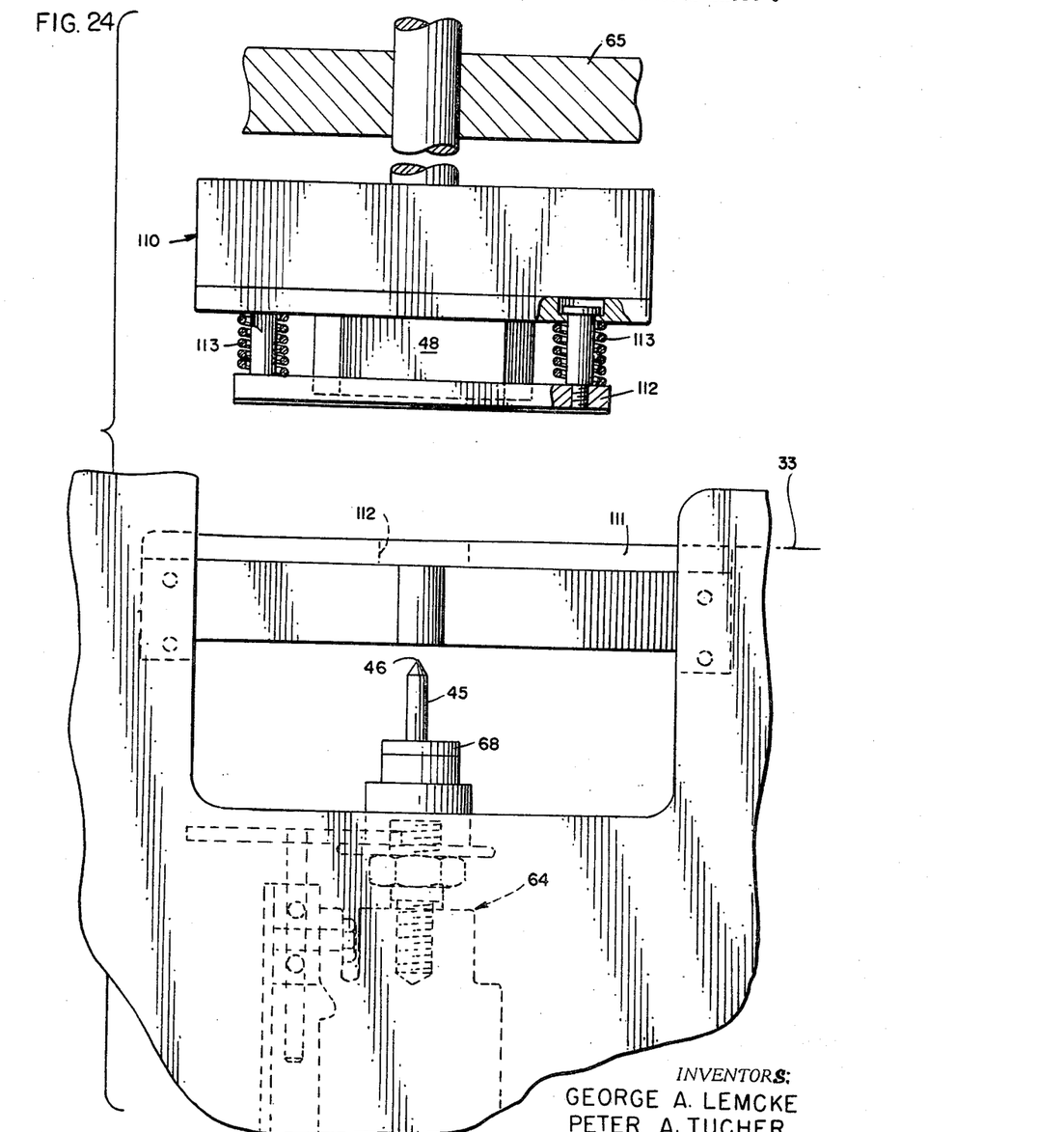
FIG. 24 is a fragmentary elevational view of another embodiment of a liner forming machine illustrating a modified form of the heat sealing and pressure station.

It has been found undesirable to form a seal through a wrinkle which may form in the sheet. FIG. 24 illustrates a modification of the grommet head which minimizes the possibility of a wrinkle forming in the sheet under the seal. As therein illustrated, there is shown an improved grommet assembling head 110 mounted on the turret 65 of a bag making machine for cooperation with the grommet head 64. As heretofore described, the grommet head 64 includes the hollow grommet spindle 45 provided with the knife edge 46 for penetrating the sheet 33. The grommet head 64 is mounted on the machine below a suitable support table 111, which may be of stainless steel, provided with an aperture 112 to receive the washer-like surface 68 of the grommet spindle 45. The modified grommet assembling head 66 includes a pressure block or frame 112 carried by the grommet assembling head 110 and movable to support the sheet 33 taut against the support table when the grommet assembling head 110 is lowered. In this position suitable springs 113 bias the pressure frame 112 against the sheet 33 to hold the sheet taut. The spindle 45 may now penetrate the sheet 33 without danger of the sheet wrinkling. Additional downward movement of the grommet assembling head 110 will move the pressure element 48 through the opening in the pressure frame 112 into engagement with the grommet washer 40 to effect the seal between the grommet 39 and the sheet 33.

Although the present invention has been described by reference to different embodiments thereof, it will be apparent that numerous other modifications and embodiments will be devised by those skilled in the art which will fall within the true spirit and scope of the present invention.

What is claimed as new and desired to be secured by Letters Patent of the United States is:

1. Apparatus for securing a tube assembly to a thin sheet of plastic and like material, the tube assembly including a tube grommet having a stem extending through an opening in the sheet and sealed thereto and a tube section assembled over the stem, said apparatus including:
 a machine bed for receiving a sheet of material extending across a work axis defining a work station;
 a grommet spindle along said work axis for receiving a grommet;
 means for moving said grommet spindle along said work axis to drive the stem of a grommet through the sheet;
 a movable turret having a plurality of workheads selectively alignable along said work axis;
 a first one of said workheads including means for forming a seal between the grommet and the sheet;
 a second one of said workheads including means for assembling a tube section over the stem of the grommet; and
 means for selectively moving said turret for alternately aligning said first and said second workheads with the grommet spindle.

2. Apparatus for securing a tube assembly to a thin sheet of plastic and like material, the tube assembly including a tube grommet having a stem extending through an opening in the sheet and sealed thereto and a tube section assembled over the stem, said apparatus including:
 a machine bed for receiving a sheet of material;
 a grommet spindle for receiving a grommet and defining work station means;
 turret means having a plurality of workheads selectively alignable with said grommet spindle;
 a first one of said workheads including means for forming a seal between the grommet and the sheet;
 a second one of said workheads including means for assembling a tube section over the stem of the grommet; and
 means for selectively moving said turret means and said grommet spindle relative to each other for alternately aligning said first and said second workheads with said grommet spindle.

3. Apparatus as set forth in claim 2 and additionally including means for advancing the sheet of plastic material along said machine bed.

4. Apparatus as set forth in claim 3 and additionally including means for advancing a second sheet of material superimposed upon said first sheet and simultaneously therewith.

5. Apparatus as set forth in claim 4 and additionally including means for sealing the edges of said sheets together to define a closed container, and additionally including means for separating one such container from a succeeding container.

6. Apparatus as set forth in claim 2 above wherein said grommet spindle includes means for piercing said sheet.

7. Apparatus as set forth in claim 2 wherein said first one of said workheads includes means for providing an heat seal between the grommet and the sheet.

8. Apparatus as set forth in claim 7 wherein said first one of said workheads additionally includes pressure means for providing the simultaneous application of heat and pressure between the grommet and the sheet.

9. Apparatus as set forth in claim 2 above wherein said second workhead includes jaw means for gripping a tube section.

10. Apparatus as set forth in claim 9 and additionally including means for introducing pressurized fluid into said tube during assembly of the tube with the grommet.

11. Apparatus as set forth in claim 10 above wherein the last mentioned means includes air passageway extending through said grommet spindle.

12. Apparatus as set forth in claim 9 above wherein said jaw means are biased together with a predetermined radial force so as to allow for expansion of the tube and jaws as the tube is assembled over a grommet.

13. Apparatus as set forth in claim 2 above wherein the last mentioned means includes means for oscillating said turret relative to said grommet spindle.

14. Apparatus for securing a tube assembly to a thin sheet of plastic and like material, the tube assembly including a tube grommet having a stem extending through an opening in the sheet and sealed thereto and a tube section assembled over the stem, said apparatus including:
 means for supporting the grommet to prevent collapse of the grommet stem;

means for gripping one end of a tube with a predetermined radial force; and means for assembling the tube over the stem of said grommet radially expanding said tube while maintaining said radial force substantially constant.

15. Apparatus as set forth in claim 14 wherein said last mentioned means additionally includes means for directing pressurized fluid into said tube to radially expand the tube while it is assembled over the stem.

16. A method of securing a tube assembly to a thin sheet of plastic and like material, the tube assembly including a tube grommet having a stem extending through an opening in the sheet and sealed thereto and a tube section assembled over the stem, said method including:

supporting the grommet on a spindle to prevent collapse of the grommet stem;

gripping a tube with a predetermined radial force adjacent one end thereof; and assembling said one end of the tube over the stem of said grommet radially expanding said tube while maintaining said radial force substantially constant.

17. A method as set forth in claim 16 wherein the last mentioned step includes directing pressurized fluid into the tube to radially expand the tube as it is assembled over the stem.

References Cited

UNITED STATES PATENTS

| | | | |
|---|---|---|---|
| 2,498,357 | 2/1950 | Breisch | 29—450 |
| 3,244,576 | 4/1966 | Swartz | 156—583 XR |
| 3,283,671 | 11/1966 | Campbell | 93—8 |

BERNARD STICKNEY, *Primary Examiner.*